United States Patent [19]

Nakayama

[11] Patent Number: 5,132,703
[45] Date of Patent: Jul. 21, 1992

[54] IMPROVEMENT OF THERMAL HISTORY CONTROL IN A RECORDER USING A LINE THERMAL HEAD

[75] Inventor: Etsuro Nakayama, Tokyo, Japan

[73] Assignee: Yokogawa Electric Corporation, Tokyo, Japan

[21] Appl. No.: 666,830

[22] Filed: Mar. 8, 1991

[51] Int. Cl.$^5$ .................... B41J 2/365; G01D 9/00
[52] U.S. Cl. .................... 346/76 PH; 400/120
[58] Field of Search .................... 346/76 PH; 400/120

[56] References Cited

U.S. PATENT DOCUMENTS

| | | | |
|---|---|---|---|
| 4,704,617 | 11/1987 | Sato et al. | 346/76 PH |
| 5,006,866 | 4/1991 | Someya | 346/76 PH |

Primary Examiner—Benjamin R. Fuller
Assistant Examiner—Huan Tran
Attorney, Agent, or Firm—Moonray Kojima

[57] ABSTRACT

A recorder using a line thermal head is provided with a digital delay circuit for driving heating elements a plurality of times on the basis of one piece of recording data and a thermal history circuit for controlling the driving of the heating elements on the basis of accumulated heat temperature data of the heating elements themselves stored in advance in a memory. This arrangement makes it possible to reduce stepped recording attributable to high speed feeding of recording paper, and to prevent the lowering of printing quality caused by the continuous driving of the heating elements.

5 Claims, 13 Drawing Sheets

Fig. 1 (PRIOR ART)
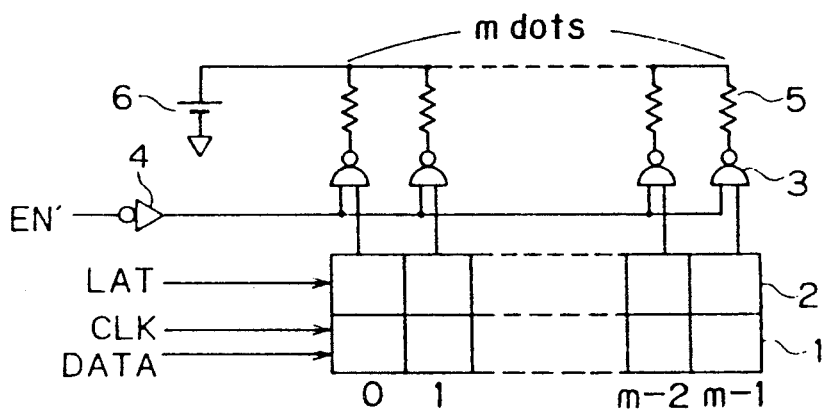
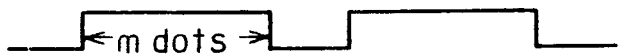
Fig. 2 (a) DATA
(PRIOR ART)
Fig. 2 (b) CLK
(PRIOR ART)
Fig. 2 (c) LAT
(PRIOR ART)
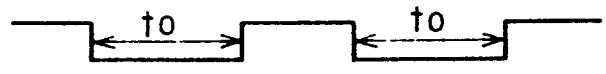
Fig. 2 (d) EN'
(PRIOR ART)

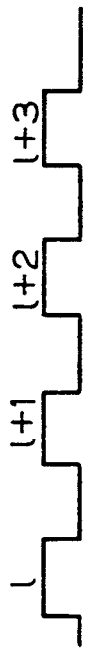
Fig.7(a) Internal Clock Cycle
Fig.7(b) Output from Memory 11
Fig.7(c) Output from Latch 12
Fig.7(d) Output from Subtract Circuit 9
Fig.7(e) Output from Latch 10

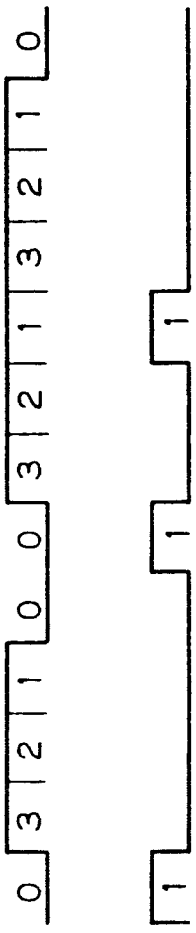
Fig.8(a) Line Scanning Interval
Fig.8(b) Output Data from Memory 11 (Address A1)
Fig.8(c) Input di.1 to Dataselector 7 Select Pin
Fig.8(d) Output from Dataselector 7
Fig.8(e) Output from Flipflop 8
Fig.8(f) Output from Subtract Circuit 9

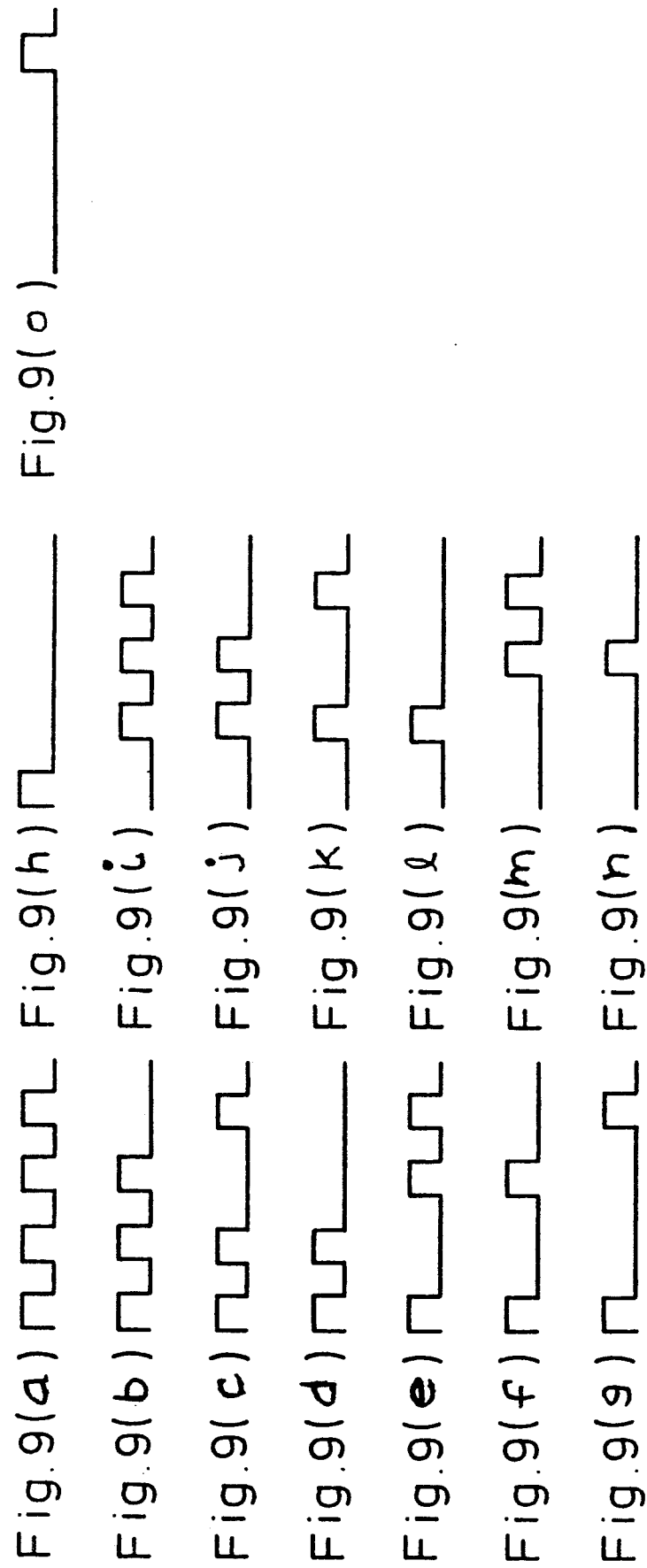

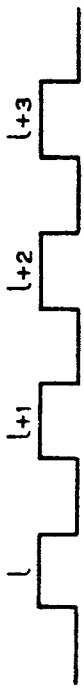
Fig.11(a) Internal Clock Cycle
Fig.11(b) Output from Memory 15
Fig.11(c) Output from Latch 16
Fig.11(d) Output from Memory 13
Fig.11(e) Output from Latch 14
Fig.11(f) Output from And-Gate 18

Fig.14(a) Line Scaning Interval

Fig.14(b) Output Data from Memory 11₁ (Address A(l))

Fig.14(c) Input to Dataselector 7₁

Fig.14(d) Output from Dataselector 7₁

Fig.14(e) Output from Flipflop 8₁

Fig.14(f) Output from Subtract Circuit 9₁

Fig.14(g) Output Data from Memory 11₂ (Address A(l))

Fig.14(h) Input to Dataselector 7₂

Fig.14(i) Output from Dataselector 7₂

Fig.14(j) Output from Flipflop 8₂

Fig.14(k) Output from Subtract Circuit 9₂

THERMAL HISTORY CONTROL IN A RECORDER USING A LINE THERMAL HEAD

BACKGROUND OF THE INVENTION

1. Field of Invention

This invention relates to a recorder for effecting waveform recording on a recording paper using a line thermal head; and, more particularly, to improvements thereof resulting in finer stepped portions attributable to the feeding pitch of the recording paper.

2. Description of related art

Known in the art is a recorder for recording waveforms in which recording is effected by a plurality of heating elements, arranged at fixed intervals for constituting a line thermal head, being driven and heated so as to develop color in a thermosensitive recording paper on the basis of the heat thus produced; or by use of ink on an inked ribbon being transferred onto the recording paper.

FIG. 1 is a block diagram depicting a conventional recorder, and FIGS. 2(a),2(b) are timing charts for explaining operation of the recorder of FIG. 1. Data corresponding to m dots for one line, as shown in FIG. 2(a), are consecutively stored in a shift register 1 in response to m clock pulses CLK, shown in FIG.2(b). When data for one line are stored in shift register 1, the data are latched by latches 2, by means of latch pulse LAT, shown in FIG. 2(c). Output data from latches 2 are applied to a respective input terminal of each of a plurality of NAND gates 3. An enable signal EN' shown in FIG. 2(d) is commonly applied to the other input input terminal of each of the NAND gates 3 via an inverter 4. It should be noted that the apostrophe (') indicates that the signal operates on the basis of negative logic. The output terminal of each of NAND gates 3 is connected to one end of each of a plurality of heating element 5 (which constitute a line thermal head). A plus terminal of a DC power source 6 is commonly connected to the other end of each of heating elements 5.

In this circuit, interpolated data are added as recording data for each line in such a manner as to simultaneously drive the plurality of heating elements that are arranged continuously so as to record a maximum value and a minimum value of a measured value in each measurement period, for example, the heating elements include one corresponding to the maximum value and one corresponding to the minimum value.

As a result, as shown in FIG. 2(d), during time $t_o$, when enable signal EN' is a level L, a driving current flows across the heating element from the DC power source 6, and recording is effected on the basis of the one line of recording data. Then, a recording paper (not shown) is fed one line at a time at a predetermined pitch upon completion of the recording operation of one line.

Disadvantageously, with such conventional arrangement, since the recording paper is fed one line each time the recording of one line is completed, a large stepped portion between the recorded lines appears due to the feeding pitch P of the recording paper, as shown in FIG. 3. It should be noted that arrow Y indicates the feeding direction of the recording paper. This stepped portion becomes large as the feeding speed of the recording paper increases, and results in unfavorable reproducibility of the measured waveform.

If the driving speed of the heating elements 5 is increased, the heating elements 5 are driven before their temperature is lowered sufficiently, so that the temperature becomes gradually higher. Thus, in cases where a thermosensitive recording paper is used, the area which undergoes color development becomes large and the printing quality is lowered. In the worst case, burning of the heating elements may result.

Accordingly, in order to overcome the above deficiencies, thermal history control is effected whereby the amplitude and width of the pulse applied to the heating elements are controlled on the basis of the history of the driving cycles of the heating elements. However, this approach does not use accumulated heat temperature data of the heating elements, so that high accuracy control cannot be expected.

SUMMARY OF THE INVENTION

Accordingly, an object of the invention is to overcome the aforementioned and other deficiencies and disadvantages of the prior art.

Another object is to provide a recorder which is capable of obtaining recording results in which the stepped portions attributable to the feeding pitch of the recording paper and reproducibility of the measured waveforms are greatly improved.

A further object is to provide an effective driving method which takes into account data on accumulated heat temperature using the history of the driving heating elements of the line thermal head.

A still further object is to facilitate the discrimination of recording results when a plurality of signals are recorded simultaneously.

The foregoing and other objects and advantages are attained by the invention which encompasses a recorder for effecting recording on a recording paper using heat generated by selectively driving a plurality of heating elements arranged at fixed intervals to form a line thermal head, and comprising a thermal history circuit comprising a first memory in which accumulated heat temperature data concerning the recording operation of the heating elements are stored in advance and which is adapted to read the accumulated heat temperature data for an ensuing cycle by using as its addresses the present accumulated heat temperature data and the presence or absence of recording; a second memory for temporarily storing the accumulated heat temperature data read from the first memory; a comparison circuit for comparing the accumulated heat temperature data temporarily stored in the second memory with a set temperature set in advance; and a switching element for controlling the recording operation of the heating elements in correspondence with the result of the comparison by the comparison circuit; and a digital delay circuit comprising a data selector for selectively outputting initially set number of driving intervals data of the heating elements or number of driving cycles data in which data is subtracted by the number of driving cycles, in accordance with the presence of absence of recording data which is consecutively renewed in synchronism with the operation of the feeding of the recording paper; a data transfer circuit for transforming output data from the data selector into recording data and for imparting the recording data to the switching element of the thermal history circuit; a substraction circuit for subtracting "1" with respect to a natural number of the output data from the data selector; and a third memory for temporarily storing output data from the subtraction circuit and for imparting the data to the data selector.

BRIEF DESCRIPTION OF THE DRAWINGS

FIG. 1 is a block diagram depicting a conventional recorder.

FIGS. 2(a)-2(d) are timing charts depicting operation of the circuit of FIG. 1.

FIGS. 7(a)-7(e) are timing charts depicting operation of a digital delay circuit of FIG. 4.

FIGS. 8(a)-8(f) are diagrams depicting changes in data in the digital delay circuit of FIG. 4.

FIGS. 9(a)-9(b) are diagrams depicting patterns of driving pulses based on timing charts of FIGS. 5(a)-5(d).

FIGS. 11(a)-11(f) are timing charts depicting operation of the thermal history circuit of FIG. 4.

FIGS. 14(a)-14(k) are diagrams depicting changes in data in the digital delay circuit of FIG. 13.

DETAILED DESCRIPTION OF THE PREFERRED EMBODIMENTS

Figure 4:
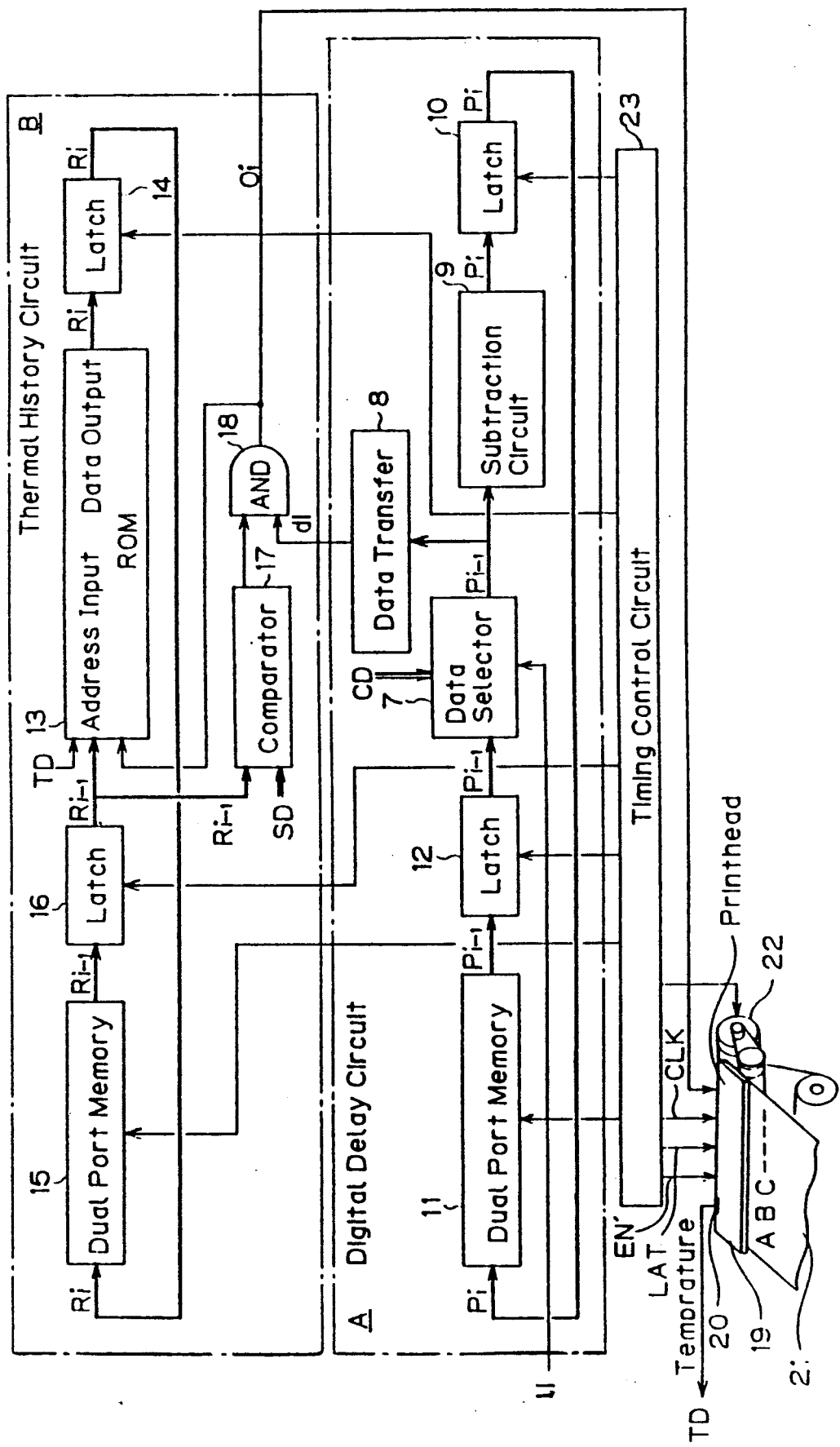
FIG. 4 is a block diagram depicting an illustrative embodiment of the invention.

FIG. 4 depicts a recorder arrangement comprising a digital delay circuit A for generating recording data for driving heating elements, and a thermal history circuit B for controlling the heating temperature of the heating elements.

In digital delay circuit A, input data $D_i$ to be recorded is inputted to a data selector 7 as a selection signal. Output data $P_{i-1}$ from a dual port memory 11 is transmitted to the data selector 7 via a latch 12. At the same time, data CD is set in advance in data selector 7. Data selector 7 outputs data selected in correspondence with a "1" or "0" of input data $D_i$ to a data transfer circuit 8 as $P_{i-1}$, and outputs the same to a subtraction circuit 9. When data $P_{i-1}$ transmitted from data selector 7 is not "0", data transfer circuit 8 transmits data di of level "1" to one input terminal of AND gate 18 of thermal history circuit B. An OR gate, for example, may be used as the data transfer circuit 8. Subtraction circuit 9 performs a subtraction $P_i = P_{i-1} - 1$ with respect to the input data $P_{i-1}$. However, subtraction circuit 9 performs subtraction only with respect to natural numbers. When $P_{i-1}$ is "0", for example, subtraction circuit 9 outputs "0" as it is as Pi. The result $P_i$ of the calculation is temporarily stored in dual port memory 11 via a latch 10. The output data $P_{i-1}$ from dual port memory 11 is transmitted to data selector 7 via latch 12.

In thermal history circuit B, accumulated heat temperature data concerning the recording operation of the plurality of heating elements of print head 19 is stored in advance in memory 13. The accumulated heat temperature data stored in memory 13 is read as accumulated heat temperature data $R_i$ for an ensuing cycle by using, as addresses, the predetermined present accumulated heat temperature data $R_{i-1}$ and the output data from AND gate 18 concerned with the presence or absence of recording, in correspondence with the ambient temperature of print head 19 measured by a temperature sensor 20, such as a thermistor. The accumulated heat temperature data $R_i$ read from memory 13 is temporarily stored a dual port memory 15 via a latch 14. The accumulated heat temperature data $R_i$ temporarily stored in memory 15 is read as the aforementioned present accumulated heat temperature data $R_{i-1}$, and is imparted to memory 13 as an address and is also imparted to one input terminal of a comparator 17. Set temperature data SD, which is set in advance, is imparted to the other input terminal of comparator 17. An output signal from comparator 17 is imparted to the other input terminal of AND gate 18. Output data $O_i$ from AND gate 18 is transmitted to memory 13, as an address, as described above, and is transmitted to the heating elements of print head 19 as a drive signal.

Thermosensitive recording paper 21 undergoes color development with the heat applied by the plurality of heating elements of the print head 19 to thereby record the information desired. The paper 21 is fed by motor 22 at a predetermined speed.

A timing control circuit 23 outputs control signals for controlling the operation of the respective components. The same arrangement as shown in FIG. 1 can be used for the print head 19.

Figure 5:
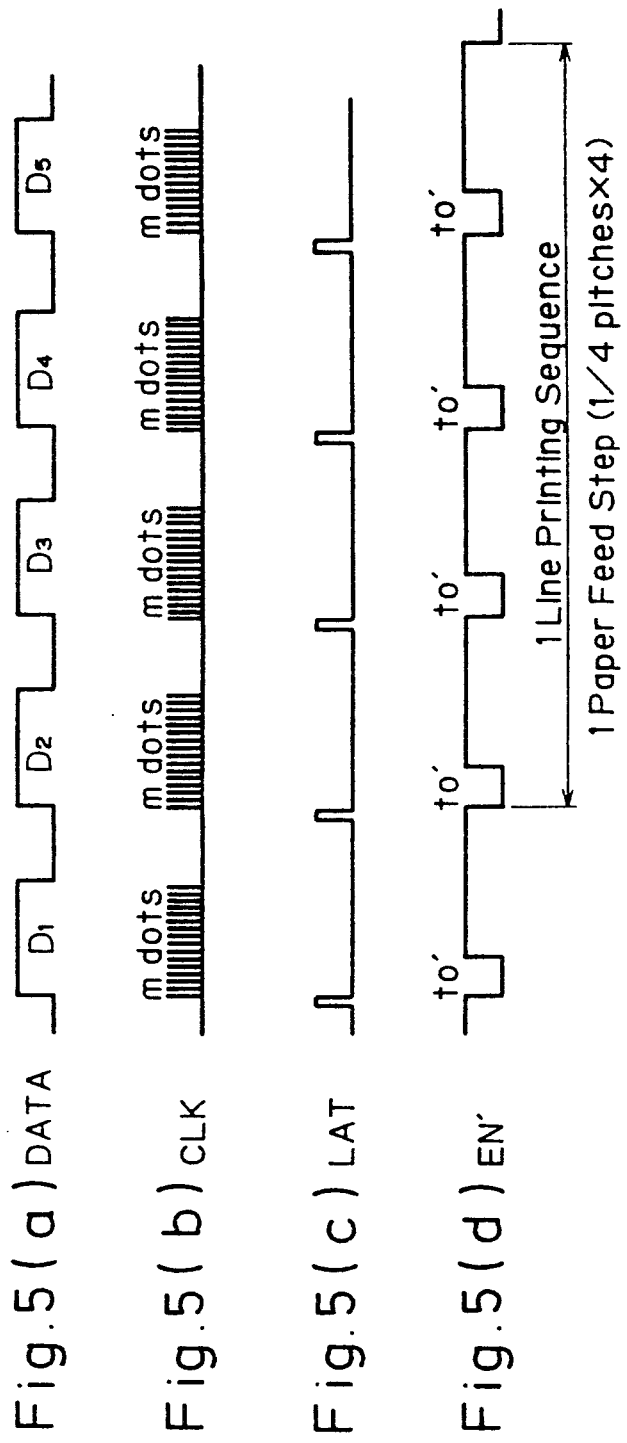
FIGS. 5(a)-5(d) are timing charts depicting operation of the embodiment of FIG. 4.

The operation of the recorder thus arranged will now be discussed with reference to the timing charts of FIGS. 5(a)-5(d), wherein m-dot data DATA is transferred a plurality of times to print head 19 and enable signal EN' is imparted four times, thereby printing one line. In FIG. 5(d), a pulse width $t_o'$ of enable signal EN' is assumed to be one-fourth of a pulse width $t_o$. That is to say, energy applied to the heating elements 5 in one driving cycle is one-fourth of that shown in FIG. 2(d), so that the recording of one line is effected by the transmission of data DATA and by enable signal EN' in four cycles. It should be noted that the feeding of the recording paper 21 is synchronized with this sequence, and the recording paper 21 is fed in steps by dividing the feeding process into one-fourth steps.

In such a driving method, since the pulse width $t_o'$ of the enable signal EN' is fixed, the recording conditions of a recording sequence starting from, for example, data $D_1$ up to data $D_4$, and the recording conditions of a recording sequence starting from, for example, data $D_2$ up to data $D_5$, are equal. Accordingly, the paper feeding speed of the recording paper 21 is equal. That is to say, if the data transmission period $D_n$, shown in FIGS. 5(a)-5(d), is assumed to be one-fourth of the data transmission period shown in FIGS. 2(a)-2(d), in accordance with the driving method shown in FIGS. 5(a)-5(d), the resolution along the direction of the time axis (i.e. the direction of feeding of the recording paper 21) becomes four times that of the driving method of FIG. 1.

Figure 6:
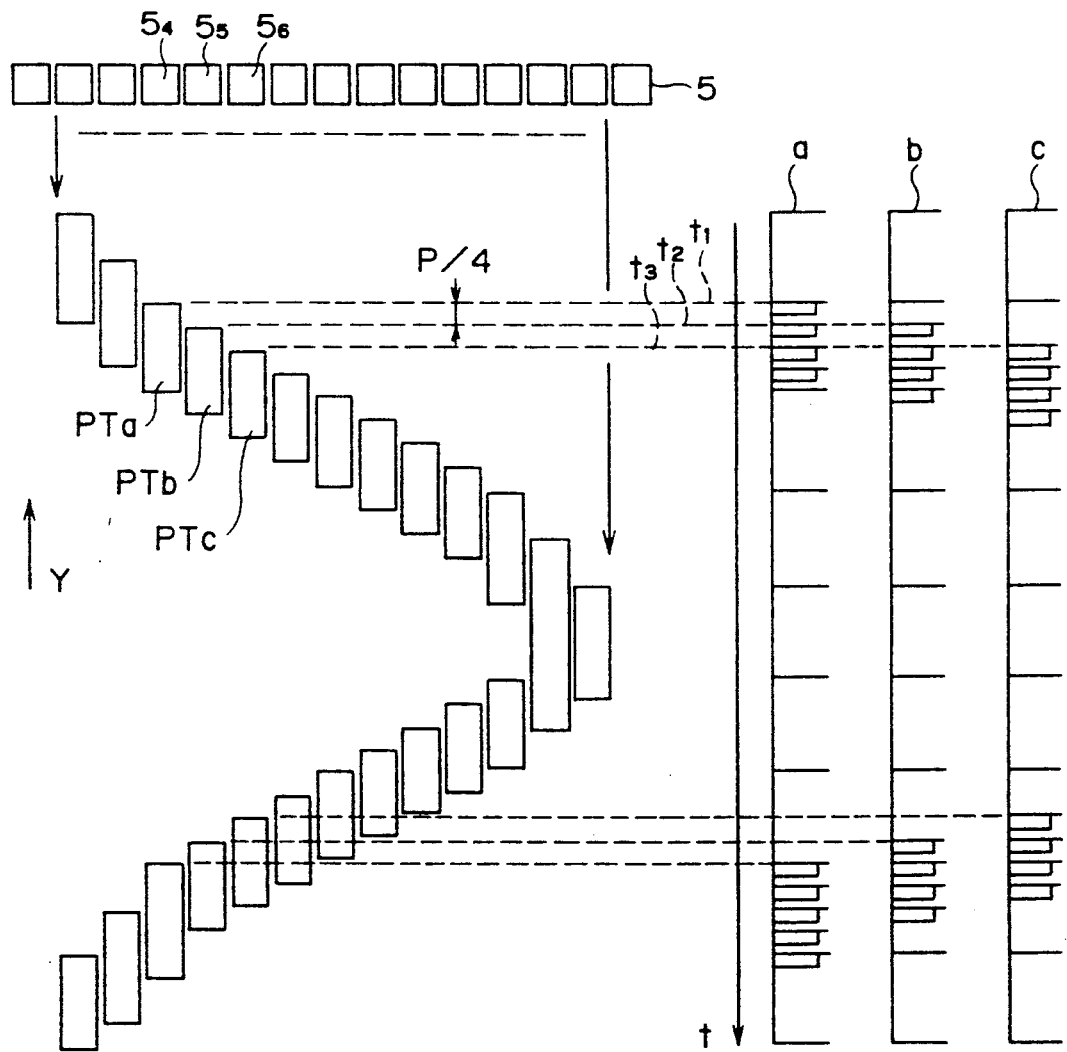
FIG. 6 is a diagram depicting an example of a recording using the embodiment of FIG. 4.

FIG. 6 depicts an example of the recording method practiced by the embodiment of FIG. 4. The recording paper is fed by one-fourth of the pitch P of FIG. 3. The heating elements 5 are driven in four operations in synchronism with the paper feeding pitch, as shown in parts a-c of FIG. 6. Part a shows the state of a heating element $5_4$ being driven. Part a shows the state of a heating element $5_5$ being driven. Part b shows the state of a heating element $5_6$ being driven.

A recording pattern $PT_a$ obtained by heating element $5_4$ is recorded in four continuous driving operations as input data $D_i$ "1" is added to data selector 7 at a time $t_1$. A recording pattern $PT_b$ obtained by heating element $5_5$ is recorded in four continuous driving operations as input data $D_i$ "1" is added, to data selector 7 at a time $t_2$. A recording pattern $PT_c$ obtained by heating element $5_6$ is recorded in four continuous driving operations as input data $D_i$ "1" is added to data selector 7 at a time $t_3$. Similarly, each subsequent recording pattern is recorded as the heating elements are continuously driven in four operations in synchronism with the paper feeding pitch.

It should be noted that if input data $D_i$ "1" is added again to data selector 7 while the heating element is being driven, the four driving operations are executed anew from that point in time, so that its recording pattern becomes long.

Figure 3:
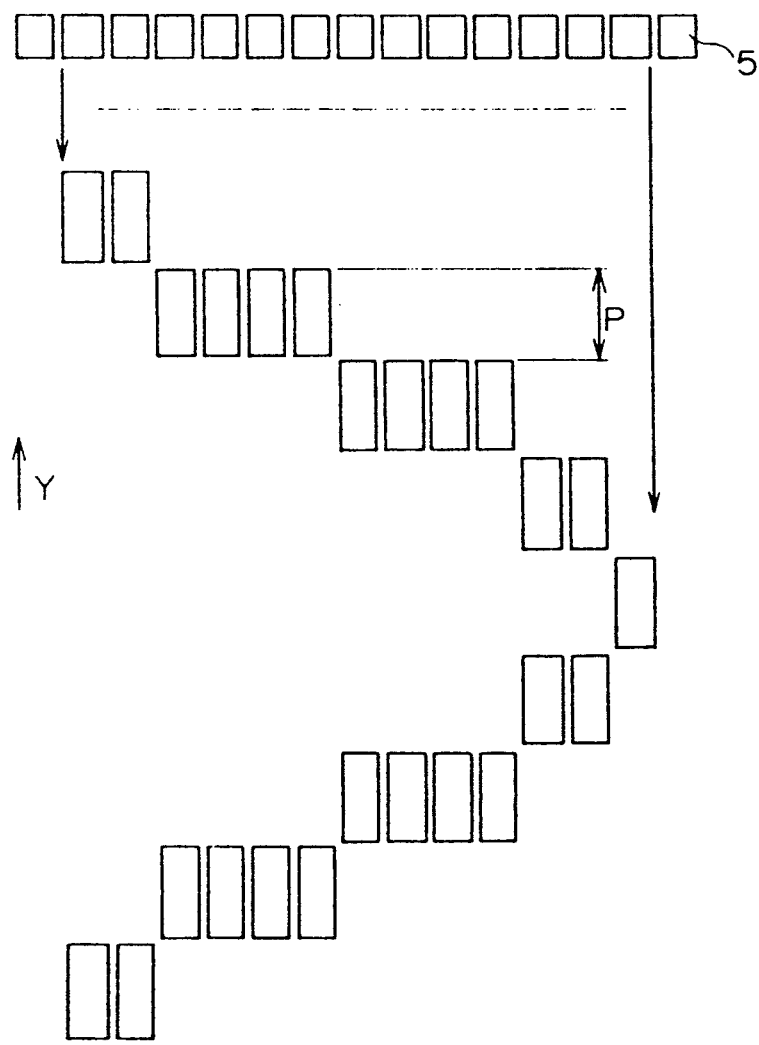
FIG. 3 is a diagram depicting an example of recording using the conventional recorder.

As is apparent from the results of the recording shown in FIG. 6, the resolution of the paper feeding pitch becomes high as compared with the results of the conventional recording shown in FIG. 3. Thus, the maximum height of the stepped portion attributable to the paper feeding pitch is substantially smaller than using the conventional method at identical speeds. Also, with the invention, the curve of the waveform is finer and smoother than with the conventional method. Moreover, since the input data is applied in synchronism with the paper feeding, the waveform of signals having a higher frequency can be recorded more accurately than with the conventional method.

FIGS. 7(a)-7(e) are timing charts for explaining operation of the digital delay circuit A of FIG. 4, wherein trigger data corresponding to each dot is stored in memory 11, and, for example, trigger data $P_{i-1,l}$ corresponding to an m−1th dot is stored in an address Al. As address Al is applied from timing control circuit 23 at the lth clock pulse of internal clock CLK, as shown in FIG. 7(a), trigger data $P_{i-1,l}$ corresponding to the m−1th dot, as shown in FIG. 7(b), is read from memory 11. The trigger data read from memory 11 is latched by latch 12, as shown in FIG. 7(c), at the rise of the l+1st clock pulse, and is imparted to data selector 7. If input data $d_{i,l}$ is "0", data selector 7 outputs $P_{i-1,l}$ as it is. If input data $d_{i,l}$ is "1", data selector 7 outputs data CD set in advance therein, instead of input data $P_{i-1,l}$.

In this embodiment, since recording is effected by dividing one line into four portions, data selector 7 outputs "4". The output data from data selector 7 is transmitted to data transfer circuit 8 and subtraction circuit 9. When data $P_{i-1,l}$ imparted from data selector 7 is not "0", data transfer circuit 8 sets data $d_i'$ to "1" and imparts the same to the AND gate 18 of thermal history circuit B. Subtraction circuit 9 performs calculation of $P_{i-1,l}-1$ and outputs the result of calculation $P_{i,l}$ to latch 10, as shown in FIG. 7(d). Latch 10 latches the result of calculation $P_{i,l}$ of subtraction circuit 9 at the rise of the l+2nd clock pulse, as shown in FIG. 7(e), and outputs data $P_{i,l}$ to memory 11 as address Al during that clock cycle.

Such a series of operations are repeated m times with respect to the intervals of the respective data $D_1-D_5$ shown in FIG. 5(a).

Next will be described how data on a certain address Al of memory 11 undergoes changes as the interval cycle is repeated, with reference to FIGS. 8(a)-8(f) which show changes in data of the respective components when a certain address Al of memory 11 is fixed.

It is assumed that data $D_{i,l}$ inputted to data selector 7 at an interval k shown in FIG. 8(a) has become "1", as shown in FIG. 8(c). At this time, "4" is set as the output data from data selector 7, as shown in FIG. 8(d). Since the output data from data selector 7 is not "0", the output data from data transfer circuit 8 becomes "1", as shown in FIG. 8(e), and recording data is imparted to thermal history circuit B. In the ensuing intervals k+1, k+2, and k+3, "1" is each subtracted from the data by subtraction circuit 9, as shown in FIG. 8 (f).

In this process, recording data is imparted from data transfer circuit 8 to thermal history circuit B four times from interval k to interval k+3, upon being triggered by an input of "1" of data $D_{i,l}$ for interval k.

Such a series of operations also hold true where "1" is inputted as data $D_{i,l}$ at interval k+5 and interval k+8, and digital delay circuit A operates like a retriggerable monostable multivibrator. Thus, data transfer circuit outputs recording data to thermal history circuit B in four intervals starting from the interval when "1" is inputed as data $D_{i,l}$.

That is to say, upon being triggered by input data $D_{i,l}$, digital delay circuit extends the input data a predetermined number of intervals set by data selector 7.

The operation of thermal history circuit B is as follows.

As an example, during the period of interval k+5-interval k+10, recording data $d_i'$ outputted from data transfer circuit 8 is continuously set to "1". If such recording data $d_i'$ is transferred as it is to print head 19, a driving current continuously flows across a relevant heating element. As a result, the temperature of the heating element rises appreciably, in which case, it would be impossible to maintain uniform printing quality and in the worst case, the heating element might burn up.

Advantageously, the invention thermal history circuit B enables the overcoming of such problem. Circuit B effects data processing such as thinning out of the recording data $d_i'$ on the basis of the accumulated heat temperature data stored in advance in memory 13, as described above, before the thermal history circuit B transfers recording data $O_i$ to print head 19.

By effecting the recording of one line through four data transmissions as in this embodiment, the pattern of driving pulses applied to the heating element 5 assumes any of the 15 patterns ($2^4-1=15$) depending on how data $D_1-D_4$ for each transmission operation are obtained, as shown in FIGS. 9(a)-9(b). That is to say, heating element 5 is consequently driven in accordance with any one of the 15 patterns by being driven and controlled in accordance with the accumulated heat temperature.

It should be noted that although in relation to FIGS. 5(a)-5(d), recording of one line is effected through the transmission of data DATA and the enable signal EN' in four transmitting operations, the number of transmitting operations is not restricted to four. It would be sufficient if the number of transmitting operations is n, wherein n is an integer of not less than two. The driving patterns in the case of n transmissions amount to $2^n-1$ patterns.

Figure 10:
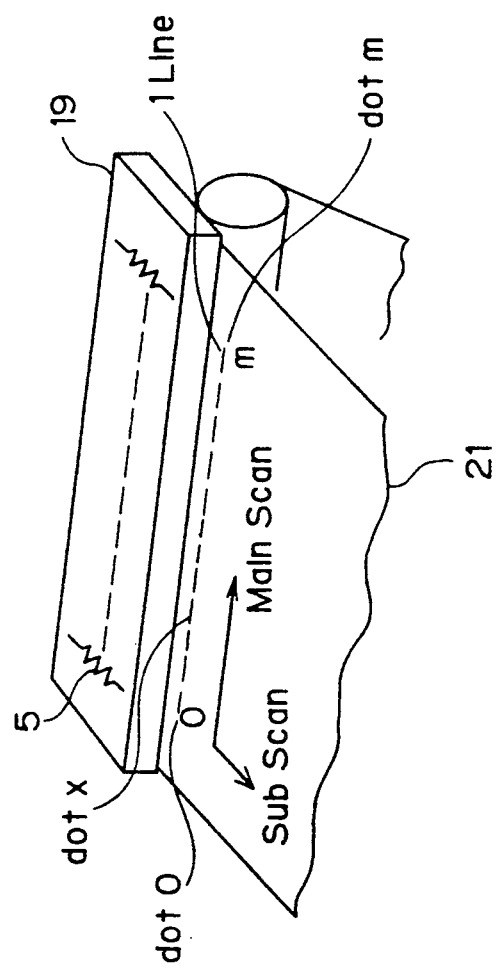
FIG. 10 is a perspective view of an important part of FIG. 4.

The accumulated heat control will now be described in greater detail. Accumulated heat temperature data corresponding to an m−xth heating element in the main scanning direction to be recorded, as shown in FIG.10, is stored in an address Ax of memory 15. Timing control circuit 23 transmits address Al to memory 15 which has temporarily stored the accumulated heat temperature data at the lth clock pulse of internal clock CLK as shown in FIG. 11 (a). As a result, memory 15 outputs accumulated heat temperature data $R_{i-1,l}$ corresponding to an m—lth heating element, as shown in FIG. 11(b).

In the l+1 cycle of internal clock CLK, latch 16 latches the accumulated heat temperature data $R_{i-1,l}$, as shown in FIG. 11(c) upon the rise of clock CLK. The accumulated heat temperature data $R_{i-1,l}$ latched by latch 16 is imparted to comparator 17 so as to be compared with the temperature data SD which has been initialized. It should be noted that accumulated heat temperature data $R_{i-1,l}$ and temperature data SD are quantized into s bits. If, for example, temperature data SD has been set to 200° C., and accumulated heat temperature data $R_{i-1,l}$ is 100° C., comparator 17 outputs "1" to AND gate 18. On the other hand, if temperature data SD has been set to 200° C., and accumulated heat temperature data $R_{i-1,l}$ is 250° C., comparator 17 outputs "0" to AND gate 18. During this l+1 clock cycle, recording data $d'_{i,l}$ read by AND gate 18 from data transfer circuit 8, and is ANDed with output data from comparator 17, as shown in FIG. 11(f). Output data Oi,l from AND gate 18 is imparted to heating element 5 of print head 19 as the data to be actually recorded. That is, heating element 5 of print head 19 is set in a recording state only when recording data $d'_{il}$ is "1" and accumulated heat temperature data $R_{i-1,l}$ is lower than temperature data SD.

During the l+1 cycle, the following control is effected simultaneously with the above-described process. Accumulated heat temperature data $R_{i-1,l}$ and output data Oi,l from AND gate 18 are inputted to memory 13 as an address. Since comparator 17 and AND gate 18 can be constituted of high speed gate elements, output data Oi,l from AND gate 18 settles in dozens of nano-seconds, so that if the clock cycle is assumed to be 100 nano-seconds, the reading of memory 13 can be completed within one clock cycle.

Memory 13 outputs the following accumulated heat temperature data $R_{i,l}$ in accordance with address $R_{i-1,l}$ and output data Oi,l, as shown in FIG. 11(d). For example, when accumulated heat temperature data $R_{i-1,l}$ is 100° C., if Oi,l is "1", memory 13 outputs bit data 180° C. as accumulated heat temperature data $R_{i,l}$ and, if Oi,l is "0", it then outputs bit data 50° C. as accumulated heat temperature data $R_{i,l}$.

In the l+2 cycle, latch 14 latches accumulated heat temperature data $R_{i,l}$ outputted from memory 13 at the rise of clock CLK in the l+2 cycle, as shown in FIG. 11(e). In addition, data latched by latch 14 is imparted to the other port of memory 15 and is written in address Al.

A series of the foregoing operations may also be subjected to parallel processing in the manner of a pipe line, and the accumulated heat temperature data $R_{i-1,l+1}$ is read from memory 15 in the l+1 clock cycle.

By executing these operations m times, print head 19 receives m pieces of recording data. Timing control circuit 23, after transmitting m pieces of data, activates a latch pulse LAT, as shown in FIG. 5(c) and allows a driving current to flow across heating element 5 by activating enable signal EN' for a time t' only once. The transmission of m pieces of data and the transmission of latch use LAT and enable signal EN' are repeated a plurality of times. FIGS. 5(a)-5(d) illustrate an example in which the transmissions are repeated four times.

An illustrative example of the operation of the embodiment will now be discussed. It is to be understood that the invention is not to be limited by this example.

During the repetition of the transmissions, the content in address Al, of memory 15, is changed in, for example, the following manner. For example, the accumulated heat data in address Al is 20° C. at the time before a first operation step, and set data SD of comparator 17 has already been set at 200° C.

By the first operation step, the accumulated heat temperature data $R_{i-1,l}$, 20° C. is read from address Al of memory 15, and is compared with the set data 200° C. using comparator 17.

At this stage, for example, the set data is higher than the accumulated heat temperature data. Thus, comparator 17 outputs "1". In this case, if recording data $d'_{i,l}$ is "1", the output Oi,l of AND gate 18 becomes "1". Output Oi,l and data $R_{i-1,l}$ are applied to memory 13 as the address thereof. Based on this address memory 13 outputs the next accumulated heat temperature data $R_{i,l}$ and this $R_{i,l}$ is, for example, 140° C. This accumulated heat temperature data $R_{i,l}$ is stored in address Al of memory 15 as a new accumulated heat temperature data.

By a second operation step, the accumulated heat temperature data $R_{i,l}$, 140° C. stored at the first operation step, is read out from address Al of memory 15, and compared with set data 200° C. using comparator 17. Even then, the set data is, for example, higher than the accumulated heat temperature data. Thus, comparator 17 outputs "1". In this case, if recording data $d'_{i+1,l}$, is "1", the output Oi+1,l of AND gate 18 becomes "1". The output Oi+1,l and data $R_{i,l}$ are applied to memory 13 as the address data thereof. Based on this address, memory 13 outputs the next accumulated heat temperature data $R_{i+1,l}$ and this $R_{i+1,l}$ is for example, 220° C. This next accumulated heat temperature data $R_{i+1,l}$ is stored in address Al of memory 15 as a new accumulated heat temperature data.

By a third operation step, the accumulated heat temperature data $R_{i+1,l}$ of 220° C. stored at the second operation step, is read out, and compared with the set data 200° C. using comparator 17. In the third operation step, the accumulated heat data is, for example, higher than the set data. Then, comparator 17 outputs "0". In this case, the output Oi+2,l of AND gate 18 becomes "0" and not based on recording data $d'_{i+2,l}$. The output of Oi+2,l and data $R_{i+1,l}$ are applied to memory 13 as the address data thereof. Based on this address, memory 13 outputs the next accumulated heat temperature data $R_{i+2,l}$ and this $R_{i+2,l}$ is, for example, 180° C. This accumulated heat temperature data $R_{i+2,l}$ is stored in address Al of memory 15 as a new accumulated heat temperature data.

In the same manner, the foregoing steps can be repeated.

Moreover, in the second operation step, if the recording data $d'_{i+1,l}$ is "0", the output Oi+1,l of AND gate 18 becomes "0". The output Oi+1,l that is "0", and data $R_{i,l}$, that is 140° C., are applied to memory 13 as the address data thereof. Based on the foregoing, memory 13 outputs, for example, 80° C. as the next accumulated heat temperature data $R_{i+1,l}$.

Accumulated heat temperature data is set in memory 13 in the following manner. The change in temperature of heating element 5 of print head 19 can be simulated by means of the amplitude and width of a driving pulse by using an initial temperature $T_0$ as a reference. That is, the structure of the print head 19 is already known, and the constants of the physical properties of the various components are also already known. From these, the thermal response to the print head 19 can be described by means of a model using an equation of heat conduction. By giving an initial temperature to this equation of heat conduction and by giving an amplitude and width of a driving pulse as input energy to the system, it is possible to simulate the temperature of heating element 5 of print head 19 for each time, through numerical calculations. It should be noted that since the equation of heat conduction is non-linear, numerical operations are conducted by using a unidimensional finite element method, so as to simulate and estimate the state of the temperature after data transmission and to create a table in memory 13.

Figure 12B:
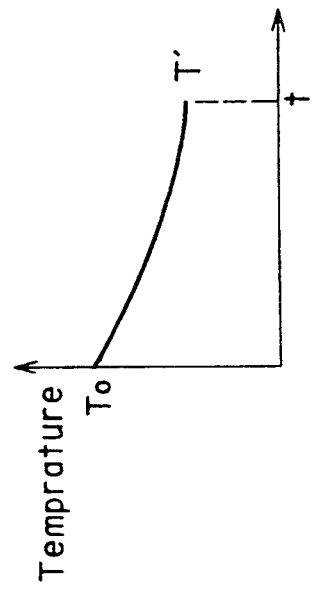
FIGS. 12(a) and 12(b) are graphs depicting simulation data used in the invention.
Figure 12A:
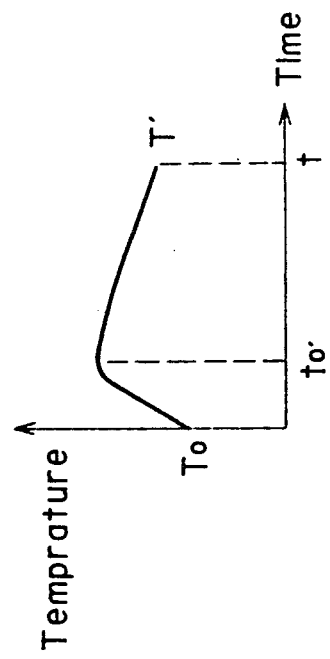

In the FIG. 4 embodiment, since the period of transmitting m dots to print head 19 and the pulse width of enable signal EN' are fixed, if initial temperature $T_0$ is known, the temperature after data transmission can be estimated through simulation. FIGS. 12(a) and 12(b) depict such states of simulation, wherein FIG. 12(a) shows the state of change in the temperature when the driving pulse is applied for a time t', and FIG. 12(b) shows the state of change in the temperature when the driving pulse is not applied.

Temperature T' after the transmission period when the driving pulse is applied or when the driving pulse is not applied, is formed into a table in advance as data by using the initial temperature $T_0$ as a parameter. Accumulated heat temperature data $R_{i-1,l}$ is set as initial temperature $T_0$, and output signal O1 from AND gate 18 is inputted to the address of memory 13 as and ON/OFF signal for the driving pulse. As a result, memory 13 outputs temperature R' after the transmission period as bit data $R_{i,l}$.

The accumulated heat temperature is calculated consecutively by storing such data in memory 13. In addition, the accumulated heat temperature data and the set temperature are compared with each other consecutively by comparator 17, with the result that a pulse train commensurate with the accumulated heat temperature data of the past is selected from a plurality of pulse trains shown in FIGS. 9(a)-9(o). Thus, thermal history control is conducted with high accuracy.

It should be noted that in the foregoing description, the temperature control was conducted in an open loop. Errors may occur in the simulation data depending on the ambient temperature. Accordingly, the temperature of the radiation plate of the print head 19 is measured by temperature sensor 20. This measured data TD is imparted to memory 13 as an address so as to change the data in memory 13. Where the temperature of the radiation plate of print head 19 has risen to an excessive degree, the driving pulse is cut off to effect control so that the temperature will not rise any further.

In addition, in order to improve the printing quality in response to the chart feeding speed and changes in the ambient temperature, the driving pulse width may be made variable. In this case, it suffices to change the data read from memory 13 by changing over the address of the memory in response to the chart feeding speed and the ambient temperature.

In accordance with the embodiment, it is possible to finely set a printing pattern of the driving pulse of the print head and improve the printing quality through use of a simple combination of a read only memory and a comparator.

Figure 13:
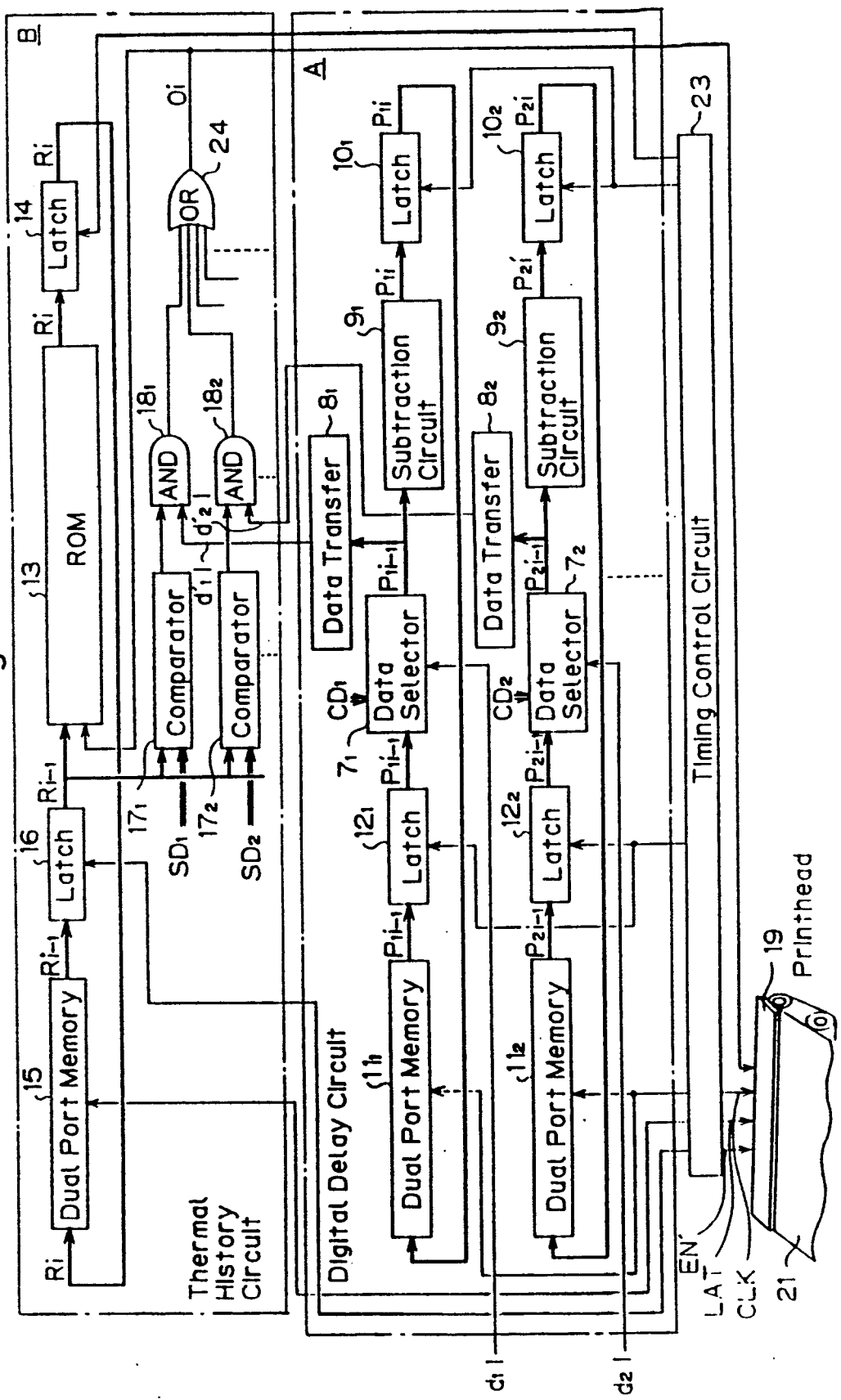
FIG. 13 is a block diagram depicting an illustrative example of an application of the invention.

FIG. 13 depicts a modification of the invention wherein two types of recording lines are used. Components that are common to those of FIG. 4 are denoted with similar reference numerals together with suffixes 1,2 attached thereto corresponding to the particular recording line.

In FIG. 13, digital delay circuit A is provided with two systems of digital one shot loops, each comprising data selector 7, data transfer circuit 8, subtraction circuit 9, latches 10,12 and memory 11, respectively, and having suffixes 1,2 attached to the reference numerals. Thermal history circuit B is provided with two systems of comparator 17 and AND gate 18 so as to process the data outputted from the digital one shot loop systems. The output data from these two systems of AND gates $18_1$, $18_2$ are imparted to print head 19 via OR gate 24. For data d1i, d2i, measured recording data are applied to each channel through A/D converters.

In this embodiment, recording with different lines is effected in the following manner. It is assumed that "4" is set in one data selector $7_1$ as a set value $CD_1$, and "6" is set in the other data selector $7_2$ as a set value $CD_2$.

FIGS. 14(a)-14(k) explain the operation of the embodiment of FIG. 13, and roughly corresponds to FIGS. 8(a)-8(f). In these FIGS. 14(a)-14(k), attention is focused on an arbitrary one dot during transmission interval, and changes are shown of the data corresponding to that one dot.

When data $D_{li}$, inputted to data selector $7_1$ in one system of digital delay circuit A during interval k, shown in FIG. 14(a), becomes "1" as shown in FIG. 14(c), the value "4" of $CD_1$ is set as the output data from data selector $7_1$, as shown in FIG. 14(d). Since the output data from data selector 7 is "4", output data $d'_{li}$ from data transfer circuit 81 becomes "1" as shown in FIG. 14(e), thereby imparting recording data to one input terminal of AND gate $18_1$ of thermal history circuit B. In the subsequent intervals K+1, k+2, K+3, "1" is subtracted from the respective data by subtraction circuit $9_1$, as shown in FIG. 14 (f).

Through such a process, recording data is imparted from data transfer circuit $8_1$ to thermal history circuit B four times from interval k to interval k+3 upon being triggered by data $D_{1i}$ of "1" inputted to data selector $7_1$ during interval k.

A similar series of operations also holds true where "1" is inputted as data $D_{1i}$ during intervals k +7 and k +9, and digital delay circuit A operates like a retriggerable monostable multivibrator. Thus, data transfer circuit $8_1$ outputs recording data to AND gate $18_1$ of thermal history circuit B during four intervals beginning with the interval when "1" is inputted as data $D_{1i}$.

Such operations is executed with respect to the other system, as shown in FIGS. 14(g)-14(k), with the suffix 2 being attached to the reference numerals. However, since "6" is set in data selector $7_2$ as data $CD_2$, recording data is imparted from data transfer circuit $8_2$ to AND gate $18_2$ of thermal history circuit B six times from interval k to interval k+5, upon being triggered by data $D_{2i}$ of "1" inputted to data selector $7_2$ during interval k.

The same also holds true where "1" is inputted as data $D_{2i}$ during interval k+7 and interval k+8, and the digital delay circuit A operates like a retriggerable monostable multivibrator. Thus, data transfer circuit $8_2$ outputs recording data to AND gate $18_2$ of thermal history circuit B during six intervals beginning with the interval when "1" is inputted as data $D_{2i}$.

That is, upon being triggered by input data $D_{1i}$, $D_{2i}$, digital delay circuit A operates to extend its input data a predetermined number of intervals set by set data $CD_1$, $CD_2$ of data selectors $7_1$, $7_2$ and varies the recording line width in correspondence with set data $CD_1$, $CD_2$.

Temperature data $SD_1$, $SD_2$ of comparators $17_1$, $17_2$ of thermal history circuit B, individually set the recording densities of data $d'_{1i}$, $d'_{2i}$ outputted from each system of digital delay circuit A. For example, when temperature data $SD_1$ of comparator $17_1$ has been set to 150° C., comparator $17_1$ outputs "1" to AND gate $18_1$ only when temperature $R_{i-1}$ imparted from latch 16 is lower than 150° C. AND gate $18_1$ outputs a logic product of the output data from comparator $17_1$ and the output data from data transfer circuit $8_1$ to OR gate 24, so that the accumulated heat temperature of the heating element is controlled to a value in the vicinity of temperature data $SD_1$. The high or low accumulated heat temperature is related to the high or low recording temperature, and the higher the accumulated heat temperature, the higher the recording density becomes. That is, the recording density can be individually set for each system by means of the temperature data $SD_1$, $SD_2$ of comparators $17_1$, $17_2$.

Thus, with the embodiment of FIG. 13, the recording line width can be set by means of data $CD_1$, $CD_2$ of data selector $7_1$, $7_2$, and the recording density can be set by data $SD_1$, $SD_2$ of comparators $17_1$, $17_2$. Accordingly, by providing a setting such that, for example, $CD_1=4$, $CD_2=6$, $SD_1=200°$ C., $SD_2=150°$ C., recording can be effected with a thin, dark line with respect to the system of the input data $d_{1i}$, while recording can be effected with a thick, light line with respect to the system of the input data $d_{2i}$. It should be noted that at a portion where the two kinds of lines intersect each other, the dark line is recorded preferentially by virtue of the OR gate 24.

Although in relation to FIG. 13 a description has been given of an example of two kinds of recording lines, it is possible to simultaneously record three or more kinds of recording lines by increasing the number of systems of digital delay circuit and the number of systems of thermal history circuit.

In addition, an arrangement may be provided such that a plurality of upper bits and a plurality of lower bits of one memory may be assigned to memories $11_1$, $11_2$, respectively.

Furthermore, it is possible to further increase the number of kinds of recording lines such as a continuous line, a broken line, and a dot-dash line, by controlling the continuity and discontinuity of the recording lines. In this case, data di inputted to data selector 7 may be subjected to ON/OFF control, by using such a circuit that data di is forced to be "0" at a fixed period synchronized with the line cycle.

As described above, in accordance with the invention, it is possible to realize a recorder which excels in the reproducibility of measured waveforms with small stepped portions attributable to the pitch of feeding of the recording paper and which is capable of obtaining recording results of high quality printing.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A recorder for recording at least one recording line on a recording paper based on at least one measurement from at least one measurement channel using heat generated by selectively driving a plurality of heating elements arranged at fixed intervals to form a line thermal head, said recorder comprising a thermal history circuit comprising
   first memory means for storing in advance accumulated heat temperature data concerning recording operation of said heating elements, and for storing another accumulated heat temperature data for an ensuing cycle when a comparison means outputs a first signal;
   second memory means for storing temporarily in one cycle the accumulated heat temperature data as read from said first memory means, and for storing temporarily another accumulated heat temperature data as read from said first memory means in an ensuring cycle;
   said comparison means for comparing in said one cycle said accumulated heat temperature data temporarily stored in said second memory means with a preselected temperature placed in advance in said comparison means and as a result thereof for generating a first or second signal;
   switching means for controlling the recording operation of said heating elements in accordance with recording data from a data transfer means of a digital delay circuit when said comparison means generates said second signal; and
a digital delay circuit comprising
   data selector means for selectively outputting initially a set number of driving intervals data of said heating elements or a number of driving cycles data in which data is subtracted by a number of driving cycles in accordance with said first or second signal from said comparison means and which is renewed consecutively in synchronism with feeding of said recording paper;
   said data transfer means for transforming output data from said data selector means into recording data and for applying said recording data to said switching means of said thermal history circuit;
   subtraction means for subtracting "1" with respect to a natural number of the output data from said data selector means; and
   third memory means for temporarily storing output data from said subtraction means and for applying said data to said data selector means.

2. The recorder of claim 1, wherein said thermal history circuit comprises a plurality of systems, said digital delay circuit comprises a plurality of systems, and wherein a plurality of measurement channels provide measurement data to the plurality of systems in each of said thermal history and digital delay circuit, and wherein the number of measurement channels is the same as the number of systems in each of the said thermal history and digital delay circuits.

3. The recorder of claim 1 further comprising means for varying the initially set number of driving cycles data of said data selector means in accordance with the particular measurement channel to be used.

4. The recorder of claim 1, further comprising means for controlling continuity of discontinuity of at least one recording line.

5. The recorder of claim 1, further comprising means for varying the initially set temperature in said comparison means in accordance with the particular measurement channel to be used.

* * * * *